United States Patent [19]

Moriyama et al.

[11] Patent Number: 5,023,296

[45] Date of Patent: Jun. 11, 1991

[54] RESIN COMPOSITION

[75] Inventors: Takamasa Moriyama, Suita; Kuniyoshi Asano, Hirakata, both of Japan

[73] Assignee: Nippon Gohsei Kagaku Kogyo Kabushiki Kaisha, Osaka, Japan

[21] Appl. No.: 452,548

[22] Filed: Dec. 19, 1989

[30] Foreign Application Priority Data

Dec. 20, 1988 [JP] Japan ............................ 63-322704

[51] Int. Cl.$^5$ ............................................. C08G 63/48
[52] U.S. Cl. ........................................ 525/58; 525/55
[58] Field of Search ............................................. 525/58

[56] References Cited

U.S. PATENT DOCUMENTS

| | | | |
|---|---|---|---|
| 4,365,041 | 12/1982 | Okamoto et al. | 525/58 |
| 4,500,677 | 2/1985 | Maruhashi et al. | 525/58 X |
| 4,511,684 | 4/1985 | Schmid et al. | 524/102 X |
| 4,749,744 | 6/1988 | Uejo et al. | 525/58 |
| 4,786,685 | 11/1988 | Takida et al. | 525/58 |
| 4,792,484 | 12/1988 | Moritani | 428/516 X |
| 4,795,781 | 1/1989 | Miyamoto et al. | 525/58 |
| 4,883,696 | 11/1989 | Iwanami et al. | 428/35.4 |

FOREIGN PATENT DOCUMENTS

| | | |
|---|---|---|
| 144239 | 6/1985 | European Pat. Off. . |
| 44-24277 | 11/1969 | Japan . |
| 51-28138 | 9/1976 | Japan . |
| 60-161453 | 8/1985 | Japan . |

OTHER PUBLICATIONS

European Search Report.

*Primary Examiner*—Joseph L. Schofer
*Assistant Examiner*—J. M. Reddick
*Attorney, Agent, or Firm*—Armstrong, Nikaido, Marmelstein, Kubovcik & Murray

[57] ABSTRACT

A resin composition comprising
(A) 100 parts by weight of a hydrolyzed eithylene-vinyl acetate copolymer,
(B) 1 to 100 parts by weight of a polyester resin and
(C) 0.1 to 50 parts by weight of a polyester-amide resin
The composition is excellent in impact strength and flex crack resistance.

4 Claims, No Drawings

RESIN COMPOSITION

BACKGROUND OF THE INVENTION

The present invention relates to a resin composition of a hydrolyzed ethylene-vinyl acetate copolymer, and more particularly to a hydrolyzed ethylene-vinyl acetate copolymer composition which has improved impact resistance and flex crack resistance and is suitable for use of moldings.

The hydrolyzed ethylene-vinyl acetate copolymer is remarkably excellent in rigidity, hardness, abrasion resistance, antistatic property and cold resistance compared to other resins suitable for use of moldings. However, the hydrolyzed copolymer is insufficient in impact resistance and flex crack resistance.

In order to improve the impact resistance of the hydrolyzed ethylene-vinyl acetate copolymer, there have, hitherto, been, conducted a method in which a plasticizer such as buthylene glycol or dioctyl phthalate is added thereto, or a method in which an ethylene-vinyl acetate copolymer is blended therewith. However, the former has defects that the plasticizer bleeds on the surface of the molded article and the molded article is remarkably lowered in mechanical properties. Also, the latter has a defect that the obtained molded article has a film of ethylene-vinyl acetate copolymer on its surface so the appearance of the molded article is impared due to the poor compatibility between the hydrolyzed ethylene-vinyl acetate copolymer with the ethylene-vinyl acetate copolymer upon molding in a molten state, though the impact resistance is extremely improved. Particularly, when injection molding, the obtained molded article has flow marks on its surface, resulting in that the preferable gloss or luster peculiar to the hydrolyzed ethylene-vinyl acetate copolymer disappears, or when blending with a pigment to give the colored molded article, the floating of the pigment is caused, which is an obstacle to practical use.

In order to solve the above-mentioned conventional defects, Japanese Unexamined patent Publication No. 218352/1988 proposes to blend a polyester with the hydrolyzed ethylene-vinyl acetate copolymer, Japanese Examined Patent Publication No. 24277/1969 proposes to blend a polyamide with the hydrolyzed copolymer or Japanese Unexamined Patent Publication No. 139733/1985 or No. 161453/1985 proposes to blend a polyamide-polyether block copolymer with the hydrolyzed copolymer. However, in case of blending the hydrolyzed copolymer with the above-mentioned polymer, the physical properties of the hydrolyzed ethylene-vinyl acetate copolymer is insufficiently improved, since the compatibility between the hydrolyzed copolymer is not necessarily sufficient with the each above polymer.

An object of the invention is to provide a resin composition of a hydrolyzed ethylene-vinyl acetate copolymer, having improved impact resistance and flex crack resistance.

This and other objects of the present invention will become apparent from the description hereinafter.

SUMMARY OF THE INVENTION

It has now been found that a polyester-amide resin can exhibit a specific property, that is, the polyester-amide resin can improve compatibility between a hydrolyzed ethylene-vinyl acetate copolymer and a polyester resin.

In accordance with the present invention, there is provided a resin composition comprising
(A) 100 parts by weight of a hydrolyzed ethylene-vinyl acetate copolymer,
(B) 1 to 100 parts by weight of a polyester resin and
(C) 0.1 to 50 parts by weight of a polyester-amide resin.

DETAILED DESCRIPTION

The hydrolyzed ethylene-vinyl acetate copolymer (A) used in the invention has an ethylene content of generally 20 to 80% by mole, preferably from 25 to 60% by mole, and a degree of hydrolysis in the vinyl acetate component of generally at least 90% by mole, preferably at least 95% by mole. When the ethylene content is less than 20% by mole, oxygen impermeability under high humidity is lowered. On the other hand, when the ethylene content is more than 80% by mole, physical properties such as oxygen impermeability and printability are impaired. When the degree of hydrolysis is less than 90% by mole, oxygen impermeability and moisture resistance are lowered.

It is preferable to use a hydrolyzed ethylene-vinyl acetate copolymer having an intrinsic viscosity $[\eta]$ (measured at 30° C. in a phenol solution containing 15% by weight water) of 0.7 to 1.5 dl/g, preferably from 0.8 to 1.3 dl/g, in addition to the ethylene content and the degree of hydrolysis within the ranges as mentioned above, from the standpoints of mechanical strength of the molded article therefrom.

The hydrolyzed ethylene-vinyl acetate copolymer used in the invention may include a small amount of comonomers, e.g., $\alpha$-olefins such as propylene, isobutene, $\alpha$-octene, $\alpha$-dodecene and $\alpha$-octadecene; unsaturated carboxylic acids and their salts, partial or complete alkyl esters, nitriles, amides and anhydrides; unsaturated sulfonic acids and their salts, and the like, so long as the excellent properties of the hydrolyzed ethylene-vinyl acetate copolymer are not lowered.

The polyester resin (B) used in the present invention includes polyethylene terephthalate and polybutylene terephthalate.

Polyethylene terephthalate is prepared by polycondensation reaction of terephthalic acid or dimethyl terephthalate and ethylene glycol as main components. In the preparation, as the ethylene glycol, an ethylene glycol a part of which is substituted with an other glycol such as cyclohexanedimethanol may be used.

Any methods are applicable to prepare polybutylene terephtharate, and there are exemplified, for instance, a polycondensation reaction of bis-($\omega$-hydroxybutyl)-terephthalate prepared by ester interchange reaction of dimethyl terephthalate and 1,4-butanediol, a polycondensation reaction of terephthalic acid and 1,4-butanediol, a method in which ester interchange reaction of terephthalic acid or dimethyl terephthalate and 1,4-diacetoxybutane is conducted and then the polycondensation of the obtained product is conducted, and the like.

It is preferable that the polyester resin (B) has a glass transition temperature (Tg) of $-50°$ to $25°$ C. and a heat of fusion ($\Delta$Hu) of not more than 30 joules/g. When the Tg is less than $-50°$ C., the blocking of the composition is caused to impair workability. On the other hand, when the Tg is more than $25°$ C., the flex crack resistance and the drawability are problematic. When the heat of fusion is more than 30 joules/g, the flex crack resistance and the drawability are lowered.

The polyester-amide resin (C) functions to improve the compatibility between the hydrolyzed ethylene-vinyl acetate copolymer (A) and the polyester resin (B).

The polyester-amide resin (C) is a polymer having ester bond and amide bond in its main chain, and further ether bond, when occasion demands. The polyester-amide resin (C) is prepared by, for instance, a method (1) in which a dicarboxylic acid, a glycol (including a glycol with ether group, hereinafter the same) and an aminocarboxylic acid or a lactam are reacted with heating in the presence of an esterification catalyst, and the reaciton product is polycondened with heating under reduced pressure, a method (2) in which a polyester prepolymr is previously prepared by reacting the dicarboxylic acid with the glycol under an esterification condition and the obtained prepolymer is polycondensed with the aminocarboxylic acid or the lactam under reduced pressure, a method (3) in which the method (1) or the method (2) is repeated except that a polyamide oligomer which is previously prepared by polymerization of the aminocarboxylic acid or the lactam is used instead of a part or all of the aminocarboxylic acid or the lactam (that is, the dicarboxylic acid, the glycol and the polyamide oligomer prepared as above, and further, when occasion demands, the aminocarboxylic acid or the lactam are reacted with heating in the presence of an esterification catalyst, and the reaction product is polycondensed with heating under reduced pressure; or the polyester prepolymer obtained as in the method (2) is polycondensed with the polyamide oligomer and, when occasion demands, the aminocarboxylic acid or the lactam under reduced pressure), a method (4) in which a polyamide prepolymer having carboxyl groups at the both ends of the prepolymer is previously prepared by reacting the aminocarboxylic acid or the lactam with the dicarboxylic acid and the obtained prepolymer is reacted with the glycol under reduced pressure, and the like. Among the above-mentioned methods (1)-(4), the method for obtaining the polyester-amide resin as a block-copolymer is preferred.

The dicarboxylic acid used in the preparation of the polyester-amide resin (C) are dicarboxylic acids having not less than 4 carbon atoms, and examples of the dicarboxylic acids are, for instance, an aromatic dicarboxylic acid such as terephthalic acid, isophthalic acid, naphthalene-2,7-dicarboxylic acid, diphenyl-4,4'-dicarboxylic acid, diphenoxyethane dicarboxylic acid or sodium 3-sulfoisophthalate; an alicyclic dicarboxylic acid such as 1,4-hexanedicarboxylic acid, 1,2- or 1,4-cyclohexanedicarboxylic acid or cyclohexyl-4,4'-dicarboxylic acid; an aliphatic dicarboxylic acid such as succinic acid, oxalic acid, adipic acid, sebacic acid or decanedicarboxylic acid; and the like. Among them, there are important terephthalic acid, isophthalic acid, adipic acid, 1,4-cyclohexanedicarboxylic acid, sebacic acid and decanedicarboxylic acid.

Examples of the glycol are, for instance, 1,4-butanediol, polyethylene glycol, polypropylene glycol, polybutylene glycol, polyhexylene glycol, ethylene oxide-propylene oxide block-copolymer or ramdom-copolymer, and the like. It is suitable that the molecular weight of the glycol is about 80 to 6,000. Among them, 1,4-butanediol and polyethylene glycol are particularly important.

Aminocarboxylic acids or lactams having not less than 6 carbon atoms are used in the preparation of the polyester-amide resin (C). Examples of the aminocarboxylic acids and the lactams are, for instance, aminocarboxylic acids such as ω-aminocaproic acid, ω-aminoenanthic acid, ω-aminocaprylic acid, ω-aminopelargonic acid, ω-aminocapric acid, 11-aminoundecanoic acid and 12-aminododecanoic acid, lactams such as caprolactam, enantholactam, capryllactam and laurolactam, hexamethylenediamine-adipic acid salt, hexamethylenediamine-sebacic acid salt, hexamethylenediamine-isophthalic acid salt, undecamethylenediamine-adipic acid salt, and the like. Among them, 11-aminoundecanoic acid, 12-aminododecanoic acid and caprolactam are important.

It is suitable that the melting point of the polyester-amide resin (C) is from about 70° to 200° C.

It is preferable that the polyester-amide resin (C) has a content of amide component (amide content) of 10 to 90% by mole. If the amide content in the polyester-amide resin (C) is outside the above-mentioned range, the effect for improving the compatibility between the hydrolyzed ethylene-vinyl acetate copolymer (A) and the polyester resin (B) is insufficiently exhibited.

The amount of the component (B) is from 1 to 100 parts by weight, preferably from 3 to 30 parts by weight, based on 100 parts by weight of the component (A). The amount of the component (C) is from 0.1 to 50 parts by weight, preferably from 0.1 to 20 parts by weight, especially from 0.1 to 10 parts by weight, based on 100 parts by weight of the component (A).

When the amount of the component (B) is less than 1 part by weight, it is difficult to improve the impact resistance and the flex crack resistance of the hydrolyzed copolymer (A). On the other hand, when the amount of the component (B) is more than 100 parts by weight, the oxygen impermeability of the obtained filmy molded article is lowered, and troubles during molding are caused, for instance, the molded article has flow marks in case of injection molding.

When the amount of the component (C) is less than 0.1 part by weight, the property as the agent for improving the compatibility between the components (A) and (B) does not function, consecuently, the impact resistance and the flex crack resistance of the hydrolyzed copolymer (A) are not improved. On the other hand, when the amount of the component (C) is more than 50 parts by weight, the oxygen impermeability is lowered.

The composition comprising the hydrolyzed ethylene-vinyl acetate copolymer (A), the polyester resin (B) and the polyester-amide resin (C) is formed into molded articles having any shapes such as pellets, films, sheets, containers, fibers, rods or tubes by melt molding. Also, there are many cases that the pulverized articles (in case of recycling of the used articles) or pellets are further subjected to melt molding. As the molding method, an extrusion such as T-die extrusion, tubular film process, blow molding, melt spinning or profile extrusion and injection molding are mainly applicable to molding of the composition of the present invention. The melt molding temperature is often selected from the range of 150° to 260° C. More specifically, there are many cases that a temperature at a discharge end of an extruder is selected from the range of 160° to 260° C.

and a temperature of a compression zone of a screw is selected from the range of 160° to 250° C. The above mentioned injection molding includes two-color molding and injection blow molding in addition to the general injection molding, and the obtained molded articles have high dimensional precision.

When the composition is subjected to melt molding, usual additives can be admixed in a suitable amount with the composition. Examples of the additives are, for instance, plasticizers such as polyhydric alcohols, stabilizers, surfactants, cross-linkable substances (such as epoxy compounds, polyvalent metal salts and organic or inorganic polybasic acids and their salts), fillers, coloring agents, fibers used as a reinforcement (glass fibers, carbon fibers, and the like), and the like. Also, other thermoplastic resins may be admixed in a suitable amount with the composition. Examples of the other thermoplastic resins are, for instance, polyolefins such as low density polyethylene, middle density polyethylene, high density polyethylene, isotactic polypropylene, ethylene-propylene copolymers, ethylene-propylene-diene terpolymers, copolymers of ethylene and an α-olefin having not less than 4 carbon atoms, ethylene-vinyl acetate copolymers, ethylene-acrylic acid ester copolymers, ionomers, polybutene and polypentene; modified polyolefins prepared by graft-modification of the above-mentioned polyolefins with an unsaturated carboxylic acid or a derivative thereof; a polyamide such as a copolymer of nylon-6 and nylon-6,6, polyvinyl chloride, polyvinylidene chloride, polystyrene, polyacrylonitrile, polyacetal, polyvinyl alcohol resins which can be melt molded, and the like.

When the extrusion is adopted as the melt molding method, not only the extrusion in which the composition of the invention is employed alone can be carried out but also there is often carried out the coextrusion in which the composition and other thermoplastic resins are melt kneaded separately and they are extruded so as to join at the inside or the outside of a die or a combining adaptor. Also, the composition of the invention can be extrusion-coated on a base material such as a plastic film, metal foil or paper. As the other thermoplastic resin used in the coextrusion, the thermoplastic resins as mentioned above can be employed. Examples of the base material in the extrusion-coating are, for instance, films, sheets or laminated films of cellophane, polypropylene, polyamide or polyester, (they may be uniaxially or biaxially stretched, or their both or either sides may be coated with a polyvinylidene chloride resin, and the like), and the like. The thus obtained films, sheets and containers are suitable for use as wrapping or packaging materials for foods, medical supplies, industrial chemical reagents, agricultural chemicals, and the like.

In the present invention, the polyester-amide resin (C) is added to the mixture of the hydrolyzed ethylene-vinyl acetate copolymer (A) and the polyester resin (B) as the agent for improving the compatibility between the components (A) and (B) to remarkably improve the mechanical properties such as the impact resistance and the flex crack resistance and the appearance of the molded article, and practical molded articles can be obtained.

The present invention is more specifically described and explained by means of the following Examples in which all per cents and parts are by weight unless otherwise noted. It is to be understood that the present invention is not limited to the Examples, and various changes and modifications may be made in the invention without departing from the sperit and scope thereof.

EXAMPLES 1-8 AND COMPARATIVE EXAMPLES 1-4

A film having a thickness of 30 μm was prepared from a composition (kinds of the components in the composition and their amounts) shown in Table 1 by using an extruder provided with a T-die under the following extrusion conditions.

| | |
|---|---|
| Extruder: Diameter: | 40 mm |
| Screw: | Full-flighted screw |
| | L/D = 26, Compression ratio = 3.8 |
| T-die: Width: | 400 mm |
| Extrusion temperature: | Feed zone: 180° C. |
| | Compression zone: 200° C. |
| | Metering zone: 230° C. |
| | Die: 220° C. |
| Screw speed: | 45 rpm |
| Film tensile speed: | 30 m/minute |

Each of (A)-1 to (A)-4 as the component (A) in Table 3 is a hydrolyzed ethylene-vinyl acetate copolymer as shown in Table 1.

TABLE 1

| | Ethylene content (% by mole) | Degree of hydrolysis (% by mole) | Intrinsic viscosity (dl/g) |
|---|---|---|---|
| (A) Hydrolyzed ethylene-vinyl acetate copolymer | | | |
| (A)-1 | 32 | 99.3 | 0.78 |
| (A)-2 | 28 | 98.9 | 0.78 |
| (A)-3 | 44 | 99.5 | 0.90 |
| (A)-4 | 39 | 99.4 | 0.76 |

Each of (B)-1 to (B)-4 as the component (B) in Table 3 is a polyester resin as shown in Table 2.

TABLE 2

| | Thermal property | | Composition (molar ratio) | | | | |
|---|---|---|---|---|---|---|---|
| | Tg (°C.) | ΔHu (joul/g) | Terephthalic acid | Adipic acid | Sebacic acid | 1,4-butane-diol | Ethylene glycol |
| | | | [B] Polyester resin | | | | |
| (B)-1 | −25 | 13 | 0.55 | 0.25 | 0.20 | 1.0 | — |
| (B)-2 | −30 | 17 | 0.40 | 0.60 | — | 1.0 | — |
| (B)-3 | −25 | 20 | 0.60 | 0.30 | 0.10 | 1.0 | — |
| (B)-4 | −15 | 20 | 0.60 | 0.20 | 0.20 | 0.40 | 0.60 |

Each of (C)-1 and (C)-2 as the component (C) in Table 3 is a polyester-amide resin as shown below.

(C)Polyester-amide resin

| (C)-1: | Melting point: 120° C. |
|---|---|
| | Amide content: 40% by mole |
| | Raw materials of the ester component: |
| | terephthalic acid/adipic acid = 6/4 (molar ratio) |
| | and 1,4-butanediol |
| | Raw material of the amide component: ε-caprolactam |
| (C)-2: | Melting point: 145° C. |

Amide content: 60% by mole
Raw materials of the ester component and the amide component are the same as the polyester-amide resin (C)-1.

As the obtained film, the oxygen permeability and pinhole resistance were measured as follows:

Oxygen permeability (cc/m$^2$·24hr·atom)

An oxygen permeability is measured by using OX-TRAN 100 tester commercially available from MODERN CONTROLS, INC at 25° C. under 75% RH.

Pinhole resistance

The film is twisted 440° in the 3.5 inches of the stroke followed by 2.5 inches straight horizontal stroke at 20° C. The above operation is repeated 100 times [Test (1) in Table 3] or 300 times [Test (2)]. The number of pinholes observed by the naked eye in an area of 28 cm × 19 cm of the film are counted.

The results are shown in Table 3.

TABLE 3

| Ex. No. | Kind of the component | | | Weight ratio of (A)/(B)/(C) |
|---|---|---|---|---|
| | The component (A) | The component (B) | The component (C) | |
| Ex. 1 | (A)-1 | (B)-1 | (C)-1 | 100/10/1.0 |
| Ex. 2 | (A)-1 | (B)-2 | (C)-1 | 100/5/2.0 |
| Ex. 3 | (A)-2 | (B)-3 | (C)-2 | 100/15/0.5 |
| Ex. 4 | (A)-2 | (B)-4 | (C)-2 | 100/20/1.0 |
| Ex. 5 | (A)-3 | (B)-1 | (C)-1 | 100/5/3.0 |
| Ex. 6 | (A)-3 | (B)-2 | (C)-2 | 100/10/0.5 |
| Ex. 7 | (A)-4 | (B)-3 | (C)-1 | 100/10/12.0 |
| Ex. 8 | (A)-4 | (B)-4 | (C)-2 | 100/5/5 |
| Com. Ex. 1 | (A)-1 | (B)-1 | — | 100/10/0 |
| Com. Ex. 2 | (A)-1 | (B)-1 | (C)-1 | 100/10/0.05 |
| Com. Ex. 3 | (A)-1 | (B)-1 | (C)-1 | 100/10/60 |
| Com. Ex. 4 | (A)-1 | (B)-1 | (C)-1 | 100/150/5 |

TABLE 3-continued

| Ex. No. | Film property | | |
|---|---|---|---|
| | Oxygen permeability (cc/m$^2$ · 24 hr · atm) | Pinhole resistance | |
| | | Test (1) | Test (2) |
| Ex. No. 1 | 1.0 | 0 | 4 |
| Ex. No. 2 | 0.9 | 1 | 6 |
| Ex. No. 3 | 1.0 | 0 | 3 |
| Ex. No. 4 | 1.2 | 0 | 2 |
| Ex. No. 5 | 2.5 | 1 | 5 |
| Ex. No. 6 | 2.6 | 0 | 3 |
| Ex. No. 7 | 2.8 | 0 | 1 |
| Ex. No. 8 | 1.6 | 0 | 3 |
| Com. Ex. 1 | 1.0 | 5 | 28 |
| Com. Ex. 2 | 1.0 | 4 | 25 |
| Com. Ex. 3 | 30.0 | 0 | 1 |
| Com. Ex. 4 | 120.0 | 0 | 0 |

In addition to the ingredients used in the Examples, other ingredients can be used as set forth in the specification to obtain substantially the same results.

What we claim is:

1. A resin composition, comprising:
   (A) 100 parts by weight of a hydrolyzed ethylene-vinyl acetate copolymer,
   (B) 1 to 100 parts by weight of a polyester resin and
   (C) 0.1 to 50 parts by weight of a polyester-amide resin, the polyester-amid resin functions to improve the compatibility between the hydrolyzed ethylene-vinyl acetate copolymer and the polyester resin.

2. The composition of claim 1, wherein said hydrolyzed ethylene-vinyl acetate copolymer (A) has an ethylene content of 20 to 80% by mole and a degree of hydrolysis in the vinyl acetate component of at least 90% by mole.

3. The composition of claim 1, wherein said polyester resin (B) has a glass transition temperature of −50° to 25° C. and a heat of fusion of not more than 30 jouls/g.

4. The composition of claim 1, wherein said polyester-amide resin (C) has an amide content of 10 to 90% by mole.

* * * * *